(12) United States Patent
Shi et al.

(10) Patent No.: US 11,481,649 B2
(45) Date of Patent: Oct. 25, 2022

(54) ADAPTING A BASE CLASSIFIER TO NOVEL CLASSES

(71) Applicant: Robert Bosch GmbH, Stuttgart (DE)

(72) Inventors: Xiahan Shi, Renningen (DE); Martin Schiegg, Korntal-Muenchingen (DE); Leonard Salewski, Stuttgart (DE); Max Welling, Bussum (NL); Zeynep Akata, Amsterdam (NL)

(73) Assignee: Robert Bosch GmbH, Stuttgart (DE)

( * ) Notice: Subject to any disclaimer, the term of this patent is extended or adjusted under 35 U.S.C. 154(b) by 283 days.

(21) Appl. No.: 16/903,358

(22) Filed: Jun. 16, 2020

(65) Prior Publication Data

US 2021/0012226 A1 Jan. 14, 2021

(30) Foreign Application Priority Data

Jul. 8, 2019 (EP) .................................... 19184870

(51) Int. Cl.
| | |
|---|---|
| *G06N 5/04* | (2006.01) |
| *G06N 20/00* | (2019.01) |
| *G06N 20/10* | (2019.01) |
| *G06K 9/62* | (2022.01) |
| *G06V 10/82* | (2022.01) |
| *G06N 3/04* | (2006.01) |

(52) U.S. Cl.
CPC .............. *G06N 5/04* (2013.01); *G06K 9/627* (2013.01); *G06N 3/0454* (2013.01); *G06N 20/00* (2019.01); *G06N 20/10* (2019.01); *G06V 10/82* (2022.01)

(58) Field of Classification Search
CPC .................................. G06N 5/04; G06V 10/92
See application file for complete search history.

(56) References Cited

U.S. PATENT DOCUMENTS

| 10,748,215 B1* | 8/2020 | Winfield | ................ G06N 20/10 |
| 2019/0102659 A1* | 4/2019 | Ellis | ...................... G06K 9/6276 |
| 2019/0188760 A1* | 6/2019 | Ekambaram | ....... G06Q 30/0283 |

OTHER PUBLICATIONS

J. Snell, et al., "Prototypical Networks for Few-Shot Learning", Cornell University, 2017, pp. 1-13. https://arxiv.org/abs/1703.05175.

(Continued)

*Primary Examiner* — Scott C Anderson
(74) *Attorney, Agent, or Firm* — Norton Rose Fulbright US LLP; Gerard Messina

(57) ABSTRACT

A system for adapting a base classifier to one or more novel classes. The base classifier classifies an instance into a base class by extracting a feature representation from the instance using a feature extractor and matching it to class representations of the base classes. The base classifier is adapted using training data for the novel classes. Class representations of the novel classes are determined based on feature representations of instances of the novel classes. The class representations of the novel and base classes are then adapted, wherein at least one class representation of a novel class is adapted based on a class representation of a base class and at least one class representation of a base class is adapted based on a class representation of a novel class. The adapted class representations of the base and novel classes are associated with the base classifier.

18 Claims, 5 Drawing Sheets

(56) References Cited

OTHER PUBLICATIONS

S. Gidaris, et al.: "Dynamic Few-Shot Visual Learning Without Forgetting", Cornell University Library, Apr. 25, 2018, pp. 1-11. https://arxiv.org/abs/1804.09458.

M. Kampffmeyer, et al.: "Rethinking Knowledge Graph Propagation for Zero-Shot Learning", Cornell University Library, Mar. 27, 2019, pp. 1-13. https://arxiv.org/abs/1805.11724.

S. Gidaris, et al.: "Generating Classification Weights With GNN Denoising Autoencoders for Few-Shot Learning", Cornell University Library, May 3, 2019, pp. 1-10. https://arxiv.org/abs/1905.01102.

* cited by examiner

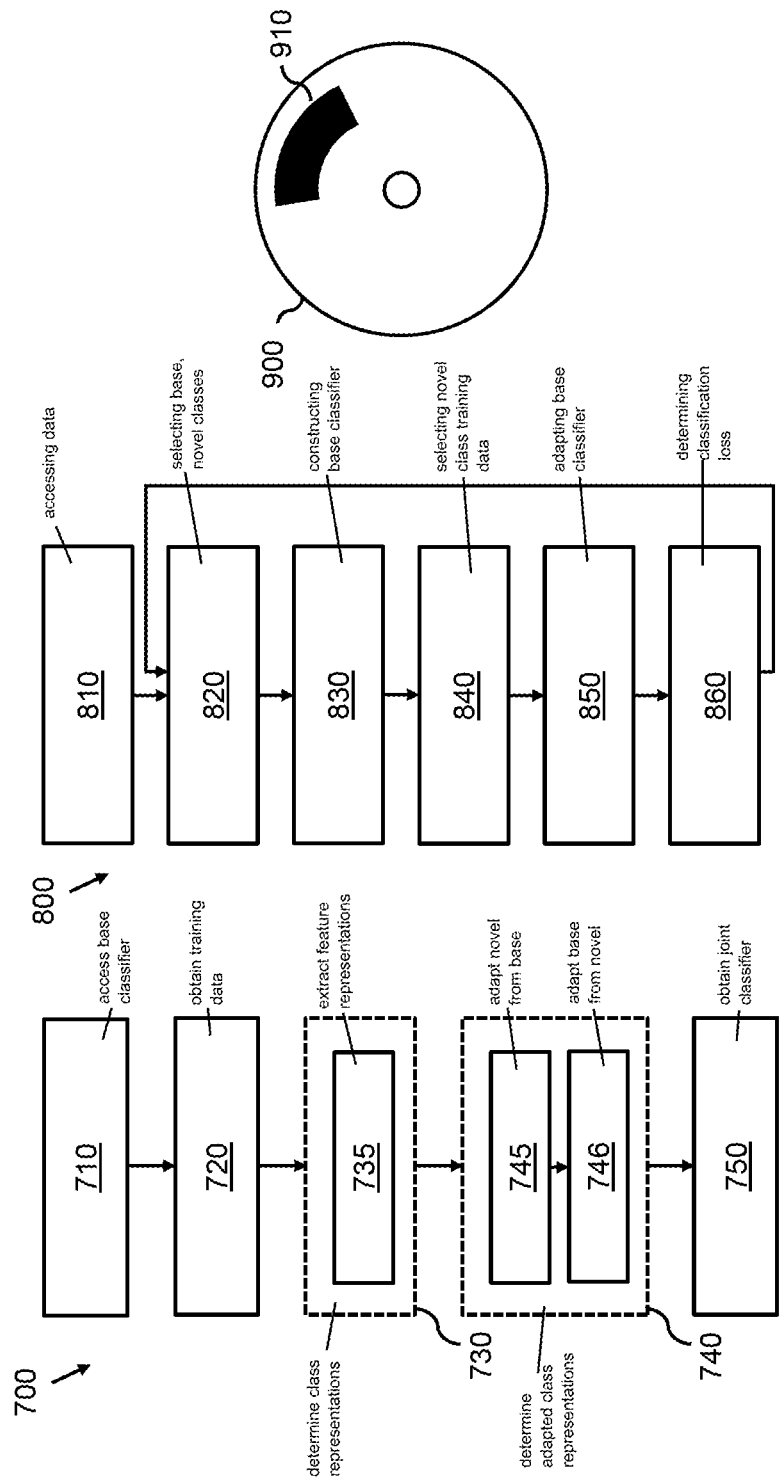

ADAPTING A BASE CLASSIFIER TO NOVEL CLASSES

CROSS REFERENCE

The present application claims the benefit under 35 U.S.C. § 119 of European Patent Application No. EP 19184870.4 filed on Jul. 8, 2019, which is expressly incorporated herein by reference in its entirety.

FIELD

The present invention relates to a system for adapting a base classifier to one or more novel classes, and to a corresponding computer-implemented method. The present invention further relates to a system for learning a set of transformation parameters, the set of transformation parameters being for adapting a base classifier to one or more novel classes, and to a corresponding computer-implemented method. The present invention further relates to a computer-readable medium comprising instructions to perform either method and/or the set of transformation parameters.

BACKGROUND INFORMATION

Modern machine learning techniques are able to classify images to an impressive degree of accuracy, and as a consequence, image classification is more and more used in real-life applications such as autonomous driving, medical imaging, etc. However, the quality of machine learning models trained using conventional techniques hinges to a large degree on the amount of available training data. For example, a large number of examples per class may be needed to reliably classify instances into that class.

However, especially in settings such as autonomous driving, there can be a large number of different classes, e.g., different traffic signs, various other types of traffic participants, etc. Moreover, characteristics of such classes may depend on where the machine learning model is deployed, e.g., traffic signs differ from country to country. Accordingly, large amounts of training data for many classes and many variations may be needed, making it expensive and complicated to effectively deploy such machine learning models.

Few-shot learning techniques aim to provide machine learning models that can be adapted to novel classes for which relatively few training examples are available. For example, a conventional set-up for few-shot learning is N-way K-shot classification. In this case, the goal is to discriminate N previously unseen novel classes given K labeled examples of each class. This task may be approached from a meta-learning perspective. Unlike in classical transfer learning, the goal of meta-learning is not adaptation to a specific target task, but to adapt and perform well across various new tasks presented at test time. For example, in meta-learning, parameters of a procedure to determining a N-way K-shot classifier may be determined that, over several runs, generally provide the best results.

In "Dynamic Few-Shot Visual Learning without Forgetting" by S. Gidaris and N. Komodakis (found at https://arxiv.org/abs/1804.09458 and incorporated herein by reference), a few-shot visual learning system is presented. Based on a large set of training data for a set of base classes, the goal of the system is to provide an object recognition learning system that is able to recognize objects from these base categories, as well as from novel categories for which only a few training examples are provided at test time. Object recognition is performed by a convolutional neural network-based recognition model that compares a feature vector extracted from an input image to classification weight vectors for each of the object categories. The classification weight vectors for the novel categories are inferred from the training examples of the novel categories and the classification weight vectors of the base categories. The model is trained in two stages. In the first training stage, parameters of the feature extractor and classification weight vectors of the base classes are learned. In the second training stage, parameters of the inference procedure are learned.

SUMMARY

In accordance with a first aspect of the present invention, a system for adapting a base classifier to one or more novel classes is provided. In accordance with a further aspect of the present invention, a computer-implemented method of adapting a base classifier is provided. In accordance with another aspect of the present invention, a system for learning a set of transformation parameters is provided, where the set of transformation parameters is for adapting a base classifier to one or more novel classes. In accordance with a further aspect of the present invention, a computer-implemented method of learning a set of transformation parameters is provided. In accordance with an aspect of the present invention, a computer-readable medium is also provided.

The above aspects of the present invention involve the use of classifiers to classify instances into respective classes. For example, various embodiments involve image classification, wherein an input instance comprises an image, for example, an image of a traffic situation, or more generally, an image of an environment of a control system. The classification task may be to recognize an object in the image, e.g., a particular traffic sign in an environment of an autonomous vehicle, a particular organ in a medical image, etc. However, the present invention is by no means limited to just images, e.g., the input instances to be classified may comprise various types of sensor data obtained from a sensor, e.g., video data, radar data, LiDAR data, ultrasonic data, motion data, etc. Classifications of such sensor data may be used to control various computer-controlled machines, e.g., robots, vehicles, domestic appliances, power tools, manufacturing machines, personal assistants, access control systems, etc.

The above aspects of the present invention also relate to the adaptation of such classifiers to novel classes. For example, a classifier trained on European traffic signs may be adapted to the Chinese market. In various embodiments, the classifier classifies an instance into a set of classes based on class representations of these classes. A class representation may represent one or more properties or characteristics of the class, e.g., obtained by training based on one or more class instances. Class representations are also known as class prototypes or classification weight vectors. The classifier may classify the instance by matching the instance to the respective prototypes and selecting the class whose class representation most corresponds to the instance. A prototypical network is an example of such a classifier.

In order to adapt the classifier to novel classes, class representations of the novel classes may be determined and associated with the base classifier to obtain a joint classifier. Interestingly, such a joint classifier may be for classifying instances into both the base classes and the novel classes. In other words, an aim is to adapt the classifier to quickly incorporate few-shot novel classes while at the same time maintaining discriminative power over all classes, including both previously seen base and novel classes. For example, the classifier should accurately recognize both European and Chinese traffic signs even if few Chinese traffic signs are available. The problem of determining such a classifier that can classify both base classes and novel classes, may be referred to as "generalized few-shot learning" (GFSL). It is noted that the GFSL problem of classifying into both base classes and novel classes is more challenging than the traditional FSL problem of just classifying into novel classes, e.g., the label space is much larger since it comprises both the base classes and the novel classes. In particular, models trained for FSL typically do not provide satisfactory performance in the GFSL setting.

It is noted that the base classifier and joint classifier may both use the same procedure to classify instances based on the class representations. Such a procedure may be referred to as a prototype classifier. Accordingly, the base classifier may comprise the prototype classifier and class representations of the base classes, and may classify instances based on a base label space comprising the bass class representations. The joint classifier may comprise the same prototype classifier and class prototypes for the base and novel classes, and may classify instances based on a joint label space comprising the base and novel class representations. Adapting the base classifier may comprise adapting the set of prototypes without affecting the prototype classifier, e.g., associating updated class prototypes with the base classifier.

In order to adapt a base classifier to a joint classifier that can additionally classify into one or more novel classes, typically, training data for the novel classes is obtained in the form of one or more instances of a respective novel class. Advantageously, in various embodiments, relatively little training data may suffice, e.g., the number of instances per class may be one, two, at most five, or at most ten. Based on these instances, class representations of the one or more novel classes may be determined using a feature extractor, e.g., by extracting feature representations of the instances and determining class representations of the novel classes therefrom for use by the joint classifier.

Although such class representations could be used by the joint classifier directly, this may not lead to an optimal solution. If the class representations are determined effectively as a function of their support sets, e.g., sets of instances of that class, then information from other classes can have at best an indirect effect, e.g., through learned parameters of the feature extractor. Moreover, this effect is only in one direction, e.g., base classes can effect novel classes but not the other way around. This may result in class representations that are not as globally consistent and discriminative as they could be.

Interestingly, however, in accordance with the present invention, the joint classifier is improved by not just determining class representations of the novel classes, but by additionally adapting the class representations of the base classes and the novel classes based on each other. For example, at least one class representation of a novel class may be adapted based on a class representation of a base class and at least one class representation of a base class may be adapted based on a class representation of a novel class. Also, at least one class representation of a novel class may be adapted based on a class representation of another novel class, and/or at least one class representation of a base class may be adapted based on a class representation of another base class. By using learned transformation parameters, as discussed above, the adaptations most relevant to the particular setting may be used.

Adapting both novel classes and base classes may help to obtain a globally consistent and/or discriminative set of class representations. For example, including information of similar base classes into a class representation of a novel class can increase its accuracy by in effect evening out the random effect due to the small number of instances of the novel class. However, doing just that would fail to take into account that class representations of novel classes can also be valuable to update class representations of the base classes. For example, if novel classes are relatively similar to base classes, then given a fixed set of base class representations, the optimal representation for a novel class may also be close to several base class representations. As a consequence, the cluster of instances defined by a novel class representation may overlap heavily with clusters of instances defined by the base class representations. In such a case, updating both the base class representations and the novel class representations may result in a more effective distribution of the class representations, e.g., by moving base class representations away from the novel class representations. Effectively, joint update may introduce a repellent mechanism by which overlapping base and/or novel classes are pushed apart to reduce confusion. It is noted that such effects are hard to achieve when just placing novel classes in a fixed space of base classes.

More generally, updating base class representations based on representations of similar novel classes advantageously allows to incorporate information of the instances of the novel classes into the base class representations not just in terms of general data sampling conditions but also in terms of the classes themselves. For instance, also a base class representation may be based on relatively few elements, so using additional instances that are expected to be broadly similar can help to reduce random effects in the set of instances that was originally used to determine the base class representation.

Effectively, the measures above may enable to define relations, not just from base classes to novel classes, but also from novel classes to base classes and among base and novel classes. For example, apart from using novel classes to update base class representations and using base classes to update novel classes, also novel class representations may be based on other novel classes and base class representations may be based on other base classes. Generally, some or all class representations may be updated based on respective similar other classes, regardless of whether they are base classes or novel classes. This may be particularly effective for ensuring global consistency of the class representations.

In various embodiments of the present invention, adapting the base classifier to the one or more novel classes is performed using a set of transformation parameters. For example, the set of transformation parameters may indicate, when adapting a class representation of a base or novel class, how to determine which other class representations to use and/or to what extent each other class representation influences the class representation. The set of transformation parameters can also indicate how to update the class representation, e.g., which attributes to take into account to what extent, etc. Various examples are provided throughout. Using transformation parameters is not strictly necessary but increases the flexibility and adaptability of the adaptation.

In various aspects of the present invention, the transformation parameters are themselves learned using a meta-learning approach, e.g., by repeatedly performing the above procedure for adapting a base classifier to determine which set of transformation parameter leads generally leads to the best joint classifier. Specifically, given training data for multiple classes, the transformation parameters may be learned by repeatedly selecting one or more base classes and one or more novel classes from the multiple classes; constructing a base classifier for the base classes; selecting training data for the novel classes; and adapting the base classifier to the novel classes using the set of transformation parameters to obtain a joint classifier. Performance of the set of parameters may be measured in terms of a classification loss of the joint classifier when applied to instances of the selected base and novel classes. For example, the set of transformation parameters may be updated to reduce the classification loss, e.g., using stochastic gradient descent or similar optimization techniques.

In various embodiments of the present invention, the classifier classifies an instance based on its feature representation. For instance, the feature representation may be matched to class representations of respective classes, e.g., to classify the instance into the class whose class representation best matches the feature representation of the instance. The classifier does not necessarily return a single class into which the instance is classified, e.g., the classifier may also be used to estimate a probability that an instance belongs to a given class, to determine top-n to which the instance may belong, etc.

A feature representation of an instance may be extracted from that instance by means of a feature extractor. Typically, the feature representation consists of fewer elements than the instance itself, e.g., the instance may be represented by a vector and the feature representation may be represented by a smaller vector. In that sense, the feature representation may provide a compressed representation of an instance. For example, the feature extractor may comprise a convolutional neural network (CNN) or other type of machine learning model. Interestingly, the feature extractor may be parametrized by a set of parameters. The set of parameters, e.g., weights of the CNN or other model parameters, may be trained in order to obtain a feature representation as a compressed representation of the input instance that captures the information about the instance that is most relevant to the classification task at hand. When in use, e.g., when adapting a base classifier to novel classes, the parameters of the feature extractor are typically fixed, e.g., adapting the base classifier comprises updating the class representations used by the prototype classifier but not the parameters used by the feature extractor.

Optionally, when matching a feature representation of an instance to respective class prototypes, a cosine distance between the feature representation and the class prototype is computed. Although other distance measures such as L2 distance are also possible, cosine distance is preferable since it works well both for class representations of base classes and for class representations of the novel classes. The cosine distance may have a learnable temperature parameter.

Optionally, the processor subsystem is configured to determine an adapted class representation of a certain target class by computing a weighted sum of class representations of the one or more base classes and of the one or more novel classes, e.g., an elementwise weighted sum of vectors, optionally combined with other update operators, e.g., post-convolutional transforms and non-linear operators as discussed below. By using the weighted sum, the class representation may take into account information of other class representations according to their relevance to the representation of the target class. Such a weighted sum of class representations may be regarded as a convolution, and in that sense, the weighted sum may be referred to as a "convolution operator".

Optionally, a weight of a respective class representation in the weighted sum indicates a similarity between the respective class representation and the class representation of the target class. The weight may be determined from the respective class representation and the class representation of the target class. In other words, the weights may be computed based at least in part based on the class representations themselves. Cosine similarity turns out to work particularly well, but a range of other similarity measures are possible as well.

Optionally, the weight may be determined based at least in part on one of more side information values associated to the class representations. The one or more side information values for a novel class may be independent from the one or more instances of the novel class. In other words, the side information may be information relating to the class itself rather than to the particular training instances, e.g., a semantic embedding, e.g., of textual class information, or a class-specific attribute. Such side information can be obtained, for instance, from various external sources such as a Wikipedia page relating to the class, aggregated medical datasets, etc. The side information values may be adapted along with their respective class representations while adapting the class representations, e.g., according to the same weighted sum used to adapt the respective class representations. They are not typically part of the class representations of the joint classifier though.

Including side information can particularly help to adapt class representations because it allows to update a class representation based on other class representations that may not appear similar based on the available training instances but that are nonetheless relevant as indicated by the side information. This may lead to incorporation of information into a class representation that would not be incorporated if the weights were based solely on the class representations and/or underlying training instances.

It is noted that side information is not typically used when applying the joint classifier to a non-training instance. Indeed, side information is information about a class and not about a particular instance, so it is typically not available for instances that are still to be classified. Accordingly, the joint classifier does not need to comprise the side information. The side information can still be included in the joint classifier, however, e.g., to further adapt the joint classifier to even more novel classes.

Optionally, the similarities between respective class representations and/or side information may be determined using a parametrized similarity measure, various examples of which are provided. Interestingly, the parameters of the similarity measure may be comprised in the set of transformation parameters so that the similarity measure is best adapted to the task at hand, e.g., so that the similarity measure selects other class representations that are most relevant for updating the target class representation. Interestingly, even if the number of parameters of the similarity measure is relatively large, e.g., even if the similarity measure is defined by a neural network, still, since the same similarity measure may be applied to many pairs of class representations, overfitting may be avoided. In fact, compared e.g. to determining a representation for each base class in a key space, an overall reduction in the set of parameters, and hence a more robust adaptation process, may be obtained.

Optionally, a weight of a respective class representation in the weighted sum indicates a similarity between the class of the respective class representation and the target class which is independent from their class representations. Such a weight may be accessed separately from the training dataset, or is at least not determined from the class representations and/or instances of the classes. In that sense, such weights may be regarded as relational side-information about the various classes. This relational side-information may be obtained from various external knowledge sources, e.g., as a WordNet similarity, etc. As above, relational side-information is typically not used when applying the joint classifier and so it typically does not need to be stored along with, or be comprised in, the joint classifier unless the joint classifier needs to be further adapted. Since relational side-information allows to update class representations in ways that are suggested neither by the class representations themselves nor the instances that these class representations are based on, more relevant adaptations of the class representations may be achieved.

Optionally, normalization may be applied to the class representations and/or the computed weighted sums. For example, a softmax operator or similar may be applied to the class representations. Normalization may greatly improve the accuracy of the obtained joint classifiers, because it may prevent updated class representation vectors from becoming longer than the initial class representations, thus ensuring that the updated class representations stay in the original space. When using relational side information, as discussed above, the normalization may comprise applying a softmax operator with learnable temperature. This may allow toe model to apply more effective contrast to the operator matrix, effectively making the similarity structure peakier or flatter.

Optionally, the adapted class representation of the target class may be determined by computing multiple weighted sums using respective weights. The multiple weighted sums may be combined into a single adapted class representation, e.g., as a sum or average. For example, some weighted sums may be based on a similarities between class representations and/or side information, e.g., computed with different similarity measures, other weighted sums may be based on relational side-information, etc. Thereby, different ways of updating the class representation may be combined. The different ways may be parametrized by different respective parameters. By combining weighted sums, information from other class representations may be used particularly effectively to update the target class representation.

Optionally, the adapted class representations may be determined by further adapting a feature of a class representation by computing a weighted sum of features and/or side information values of the class representation. In other words, a feature of a class representation may be adapted based on other features and/or side information values of that same class representation. The weights can for instance be comprised in the set of transformation parameters. The class representation whose feature value is adapted may be the weighted sum the class representation that is to be adapted based on other class representations. In that sense, this adaptation may be regarded as a "post-convolutional transform". If multiple weighted sums are computed, then these multiple weighted sums can be adapted separately, e.g., each based on respective weights in the set of transformation parameters. However, it is also possible to adapt class representations not after taking a weighted sum, but before that. In various embodiments, in fact, both these possibilities may end up with the same result by associativity, e.g., if linear transformations are used.

In any case, conceptually, adapting features of class representations may be regarded as applying a fully connected layer, e.g., to the class representations that are to be updated. Similarly to their use in neural networks, flexible transformations of the class representations can be captured, in particular in combination with the iterative process discussed below. In particular, such a fully connected layer may be particularly effective to incorporate side information into the joint classifier; as noted, side information values would otherwise typically not be included in the joint classifier. A reduction in the number of parameters and therefore a risk of overfitting may be achieved by performing this adaptation using multiplication with a diagonal matrix.

Optionally, the adapted class representations may be determined in an iterative process. That is, multiple iterations may be performed in which the class representations of the base and novel classes are updated. This allows to propagate class representation information over multiple hops. For example, a first class representation may be used to update a second class representation, e.g., the first and second classes may be similar. In a next iteration, the second class representation may be used to update a third class representation, e.g., the second and third classes may be similar. Thus, even if there is no direct reason to update the third class representation based on the first class representation, information from the first class representation can be used to indirectly affect the third class representation, allowing a better dispersion of the knowledge captured by the class representations. As another example, in case multiple weighted sums are computed using respective weights, e.g., one based on relational side information and one based on class representation similarity, then an update between relationally similar classes in a first iteration can affect an update between representation-wise similar classes in a second iteration, and the other way around. Thus, side information can be dispersed in a controlled way across multiple types of class similarities.

When using an iterative process in combination with weighted sums of class representations, optionally, a non-linearity may be applied to a computed weighted sum or to an average or sum of multiple such weighted sums to obtain an updated class representation. Similarly to their use in neural networks, non-linear functions allow more flexible transformations to be captured. For example, the non-linearity may be a ReLU, leakyReLU, a tan h function, etc. However, such a non-linearity is typically not applied in the last iteration so as not to restrict the final values of the class representations.

Optionally, the joint classifier is used to classify a query instance. To classify an obtained query instance, a classification score of the query instance with respect to each base class and each novel class may be determined using the joint classifier. Using this classification score, a classification of the query instance into a base class or a novel class may be determined. This way, query instances may be classified into the novel and base classes in a way that makes effective use of the training data for the novel classes, e.g., not only to determine the class representations of those novel classes themselves but also to affect the class representations of at least one base class. Accordingly, a more accurate classification of the query instance is obtained.

With regard to learning the transformation parameters from training data, optionally, such learning may be combined with learning class representations for the training data and/or parameters. Learning class representations of classes of the training dataset, as opposed to deriving them from instances, is advantageous because it allows to combine fast learning on novel classes with slower learning on classes of the training dataset. For example, training can reward global discrimination, e.g., selecting a class representation that does not necessarily represent training instances of its class most accurately but leads to a better decision boundary with respect to other classes, e.g., because in training class representations can influence each other.

Optionally, the class representations of the multiple classes and the parameters of the feature extractor are determined by learning said class representations and said parameters in a learning operation prior to learning the set of transformation parameters. Performing separate learning of the class representations and parameters can be advantageous, e.g., to reduce the number of parameters to be learned at the same time.

Optionally, the class representations of the multiple classes and/or the parameters of the feature extractor are learned alongside the transformation parameters based on the determined classification loss of the adapted base classifier. For example, the set of transformation parameters, the class representations, and/or the parameters of the feature extractor may be updated along with the transformation parameters to reduce the classification loss, e.g., in a stochastic gradient descent iteration or similar. For example, the class representations of those classes selected as base classes in a particular run may be updated to reduce the loss. Thus, effectively, the class representations and the various parameters may be learned end-to-end. Such combined learning is more flexible since it allows the class representations and feature extractor parameters to be updated based on feedback about their adaptability and/or based on based on updates to the transformation parameters. For example, the feature extractor may learn to extract features that are useful to compute a similarity between class representations. Such features would not generally be learned if the transformation parameters were learned separately from the feature extractor parameters, since this use only appears when adapting a classifier. When using side information to update class representations, combined learning may be especially beneficial since it can avoid the model from getting stuck in a representation that is inconsistent with the side information prior to determining the transformation parameters, and so helps to ensure that the side information can be benefitted from when updating the class representations. For example, if a model is optimized for using particular features, it may continue to use such features even if additional side information becomes available since the use of such features may initially provide better improvements to the model.

It will be appreciated by those skilled in the art that two or more of the above-mentioned embodiments, implementations, and/or optional aspects of the present invention may be combined in any way deemed useful.

Modifications and variations of any computer-implemented method and/or any computer readable medium, which correspond to the described modifications and variations of a corresponding system, can be carried out by a person skilled in the art on the basis of the present description.

BRIEF DESCRIPTION OF THE DRAWINGS

These and other aspects of the present invention will be apparent from and explained further with reference to the embodiments described by way of example in the following description and with reference to the figures.

FIG. 7 shows an example computer-implemented method of adapting a base classifier to one or more novel classes in accordance with the present invention.

FIG. 8 shows an example computer-implemented method of learning a set of transformation parameters in accordance with the present invention.

FIG. 9 shows an example computer-readable medium comprising data in accordance with the present invention.

It should be noted that the figures are purely diagrammatic and not drawn to scale. In the figures, elements which correspond to elements already described may have the same reference numerals.

DETAILED DESCRIPTION OF EXAMPLE EMBODIMENTS

Figure 1:
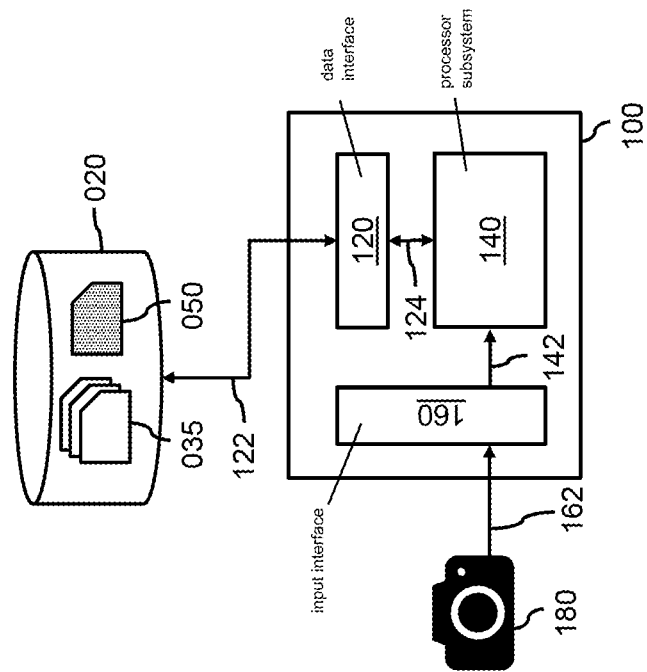
FIG. 1 shows an example system for adapting a base classifier to one or more novel classes to obtain a joint classifier in accordance with the present invention.

FIG. 1 shows a system 100 for adapting a base classifier to one or more novel classes. The system 100 may comprise a data interface 120 and a processor subsystem 140 which may internally communicate via data communication 124. Data interface 120 may be for accessing data 050 representing the base classifier. Data 050 may comprise class representations of one or more base classes of the base classifier. Data 050 may also comprise parameters of a feature extractor for extracting feature representations from instances. The base classifier may be configured to classify an instance into the one or more base classes by matching a feature representation extracted from the instance by the feature extractor to the class representations of the one or more base classes.

The processor subsystem 140 may be configured to, during operation of the system 100 and using the data interface 120, access data 050 representing the base classifier. For example, as shown in FIG. 1, the data interface 120 may provide access 122 to an external data storage 020 which may comprise said data 050. Alternatively, the data 050 may be accessed from an internal data storage which is part of the system 100. Alternatively, the data 050 may be received via a network from another entity. In general, the data interface 120 may take various forms, such as a network interface to a local or wide area network, e.g., the Internet, a storage interface to an internal or external data storage, etc. The data storage 020 may take any known and suitable form.

Processor subsystem 140 may be configured to, during operation of the system 100 and using the data interface 120, adapt the base classifier. Adapting the base classifier during the operation of the system may comprise obtaining training data 035 for one or more novel classes. The training data for a novel class comprising one or more instances of the novel class. For example, as shown in the image, data interface

120 may be for accessing training data 035. Adapting the base classifier during the operation of the system may further comprise determining class representations of the one or more novel classes. Determining a class representation of the novel class may comprise extracting feature representations of the one or more instances of the novel class using the feature extractor.

Adapting the base classifier during the operation of the system may further comprise determining adapted class representations of the base classes and of the novel classes, comprising adapting at least one class representation of a novel class based on a class representation of a base class and adapting at least one class representation of a base class based on a class representation of a novel class. Adapting the base classifier during the operation of the system may also comprise associating the adapted class representations with the base classifier to obtain a joint classifier for classifying instances into the one or more base classes and the one or more novel classes.

Optionally, processor subsystem 140 may be configured to, during operation of the system 100, obtain a query instance (not shown); determine a classification score of the query instance with respect to each base class and each novel class using the joint classifier; and determine a classification of the query instance into a base class or a novel class therefrom.

Optionally, determining the adapted class representations of the base classes and of the novel classes may be using a set of transformation parameters (not shown). For example, data interface 120 may be for accessing the set of transformation parameters. The set of transformation parameters may be obtained by learning the set of transformation parameters according to a method described herein, e.g., by system 200 of FIG. 2.

As an optional component, the system 100 may comprise an image input interface 160 or any other type of input interface for obtaining sensor data from a sensor, such as a camera 180. The sensor data may be part of instances of a novel class to which the base classifier is to be adapted and/or in a query instance to classify. For example, the camera may be configured to capture image data 162, processor subsystem 140 being configured to obtain an instance from image data 162 obtained via input interface 160.

As an optional component, the system 100 may comprise an actuator interface (not shown) for providing, to an actuator, actuator data causing the actuator to effect an action in an environment of system 100. For example, processor subsystem 140 may be configured to determine the actuator data based at least in part on a classification score of a query instance determined using the joint classifier, and to provide the actuator data to the actuator via the actuator interface.

Various details and aspects of the operation of the system 100 will be further elucidated with reference to FIGS. 3-6, including optional aspects thereof.

In general, the system 100 may be embodied as, or in, a single device or apparatus, such as a workstation, e.g., laptop or desktop-based, or a server. The device or apparatus may comprise one or more microprocessors which execute appropriate software. For example, the processor subsystem may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the functional units of the system, e.g., the data interface and the processor subsystem, may be implemented in the device or apparatus in the form of programmable logic, e.g., as a Field-Programmable Gate Array (FPGA) and/or a Graphics Processing Unit (GPU). In general, each functional unit of the system may be implemented in the form of a circuit. It is noted that the system 100 may also be implemented in a distributed manner, e.g., involving different devices or apparatuses, such as distributed servers, e.g., in the form of cloud computing.

As a concrete example, system 100 may be an automotive control system for controlling a vehicle. The base classifier and joint classifier may be image classifiers and the instances may be images, for example. The vehicle may be an autonomous or semi-autonomous vehicle, but system 100 can also be a driver-assistance system of a non-autonomous vehicle. For example, such a vehicle may incorporate the system 100 to control the vehicle based on images obtained from camera 180, as discussed. In this particular example, system 100 may be configured to determine a classification of a query image obtained from camera 180 using the joint classifier to detect an object of interest in an environment of the vehicle, for example, a traffic sign. System 100 in this example may further comprise an actuator interface (not shown separately) for providing, to an actuator, actuator data causing the actuator to effect an action to control the vehicle. System 100 may be configured to determine actuator data to control the vehicle based at least on part on the classification; and to provide the actuator data to the actuator via the actuator interface. For example, the actuator may be caused to control steering and/or braking of the vehicle. For example, the control system may control an electric motor of the vehicle to perform (regenerative) braking based on a detected situation, e.g., a speed limit traffic sign.

Figure 2:
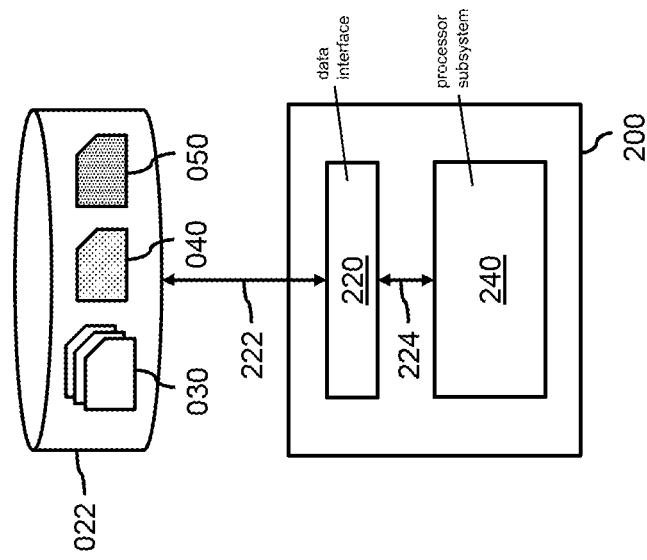
FIG. 2 shows an example system for learning a set of transformation parameters for adapting a base classifier to one or more novel classes in accordance with the present invention.

FIG. 2 shows a system 200 for learning a set of transformation parameters. The set of transformation parameters may be for adapting a base classifier to one or more novel classes, e.g., according to a method described herein, e.g., by system 100 of FIG. 1. The system 200 may comprise a data interface 220 and a processor subsystem 240 which may internally communicate via data communication 224. Data interface 220 may be for accessing training data 030 for multiple classes. The training data for a class may comprise one or more instances of the class. Data interface 220 may be for further accessing data 040 representing class representations of the multiple classes and parameters of a feature extractor for extracting feature representations from instances.

The processor subsystem 240 may be configured to, during operation of the system 200 and using the data interface 220, access data 030, 040. For example, as shown in FIG. 2, the data interface 220 may provide access 222 to an external data storage 022 which may comprise said data 030, 040. Alternatively, the data 030, 040 may be accessed from an internal data storage which is part of the system 200. Alternatively, the data 030, 040 may be received via a network from another entity. In general, the data interface 220 may take various forms, such as a network interface to a local or wide area network, e.g., the Internet, a storage interface to an internal or external data storage, etc. Data storage 022 may take any known and suitable form.

Processor subsystem 240 may be configured to, during operation of the system, learn the set of transformation parameters. To learn the set of transformation parameters, during the operation, processor subsystem 240 may perform a repeated process. The repeated process may comprise selecting one or more base classes and one or more novel classes from the multiple classes. The repeated process may further comprise constructing a base classifier 050 configured to classify instances into the one or more base classes based on the class representations of the one or more base classes and the parameters of the feature extractor. For example, as shown in the image, data interface 220 may be for accessing base classifier 050. The repeated process may further comprise selecting training data for the one or more novel classes from the training data. The repeated process may also comprise adapting the base classifier to the one or more novel classes according to a method described herein using the set of transformation parameters. For example, the base classifier may be adapted as described for processor subsystem 140 of system 100. The repeated process may also comprise determining a classification loss of the adapted base classifier for instances of the one or more base classes and the one or more novel classes.

As an optional component, the system 200 may comprise an image input interface (not shown) or any other type of input interface for obtaining sensor data from a sensor, such as a camera (not shown). Processor subsystem 240 may be configured obtain one or more instances of training data 030 as sensor data obtained from the sensor.

Various details and aspects of the operation of the system 200 will be further elucidated with reference to FIGS. 3-6, including optional aspects thereof.

In general, the system 200 may be embodied as, or in, a single device or apparatus, such as a workstation, e.g., laptop or desktop-based, or a server. The device or apparatus may comprise one or more microprocessors which execute appropriate software. For example, the processor subsystem may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the functional units of the system, e.g., the data interface and the processor subsystem, may be implemented in the device or apparatus in the form of programmable logic, e.g., as a Field-Programmable Gate Array (FPGA) and/or a Graphics Processing Unit (GPU). In general, each functional unit of the system may be implemented in the form of a circuit. It is noted that the system 200 may also be implemented in a distributed manner, e.g., involving different devices or apparatuses, such as distributed servers, e.g., in the form of cloud computing.

Generally, various embodiments relate to adapting a base classifier, which is for classifying instances into one or more base classes, to obtain joint classifier, which is for classifying instances into the one or more base classes and one or more novel classes. The problem of obtaining such a joint classifier may be referred to as "generalized few-shot learning", or GFSL. GFSL may be considered as a generalization of the problem "few-shot learning", or FSL. FSL and GFSL are now discussed from a mathematical perspective.

The FSL task, and in particular, N-way K-shot classification, may be phrased as discriminating N novel classes with a relatively small number of K labeled examples per class given in a so-called support set $\mathcal{D}_{novel}$. In other words, an FSL task may consist of N previously unseen novel classes with K labeled examples each, e.g., K≤5. More precisely, let $\mathcal{Y}_{novel}$ denote the novel class label space with $|\mathcal{Y}_{novel}|=N$, and let $$\mathcal{D}_{novel} = \bigcup_{n=1}^{N} \{x_{n,k}\}_{k=1,\ldots,K}$$

denote the so-called support set, where $x_{n,k}$ is the k-th labeled example of class n. For a new query image x, an FSL prediction may be denoted:

$$\hat{y} = \arg\max{}^{x}y \in \mathcal{Y}_{novel} p_\psi(y|x, \mathcal{D}_{novel}).$$

It is noted that traditional FSL is only concerned with discrimination of novel classes, e.g., queries may be selected from one of the novel classes. Thus, for FSL, the above arg max is only over $\mathcal{Y}_{novel}$. In other words, in FSL, previously seen classes from the train set no longer play any role when measuring the model's performance. This setup may emphasize fast adaptation to varying new tasks but, on the other hand, may not consider the model's ability to accumulate knowledge.

Interestingly, however, a joint classifier may classify instances also into the base classes of the base classifier. In other words, the joint classifier may incorporate novel classes into the seen class label space while maintaining global discrimination among all classes. This leads to a joint classifier that is much more useful in practice. More precisely, in GFSL, the joint classifier may learn to discriminate not only the novel label space $\mathcal{Y}_{novel}$ but the joint label space $\mathcal{Y}_{joint} = Y_{seen} \cup \mathcal{Y}_{novel}$ including both novel and previously seen classes. For example, the joint classifier may predict a class label y for a query instance x which may come from any of the seen and novel classes. GFSL is generally more challenging than FSL since the joint classifier may need to be able to classify into base classes as well. Mathematically, GFSL may be formulated as a generalized N-way K-shot classification problem, where the model has to discriminate the joint label space consisting of the novel classes and all seen classes from the training set, e.g., $\mathcal{Y}_{joint} = \mathcal{Y}_{seen} \cup \mathcal{Y}_{novel}$. For example, training data on which the base classifier has been trained may be denoted:

$$\mathcal{D}_{seen} = \cup_{n=1}^{N_{seen}} \{x_{b,k}\}_{i=1}^{K_n}$$

where $N_{seen}$ is the number of classes of the training data for base classifier and $K_n$ is the number of labelled examples available for the n-th training class. Typically, the number of base classes is larger than the number of novel classes, e.g., at least twice or five times as large. Also the number of instances of base classes is typically larger than the number of instances of novel classes, e.g., at least five times or at least 10 times as much. For a query instance x, the GFSL task may be phrased as determining:

$$y^* = \arg\max{}^{x}y \in \mathcal{Y}_{seen} \cup \mathcal{Y}_{novel} p_\psi(y|x, \mathcal{D}_{novel})$$

It is noted that, unlike for FSL, the arg max is now over $\mathcal{Y}_{joint}$ since x may come from any of the base and novel classes.

Figure 3:
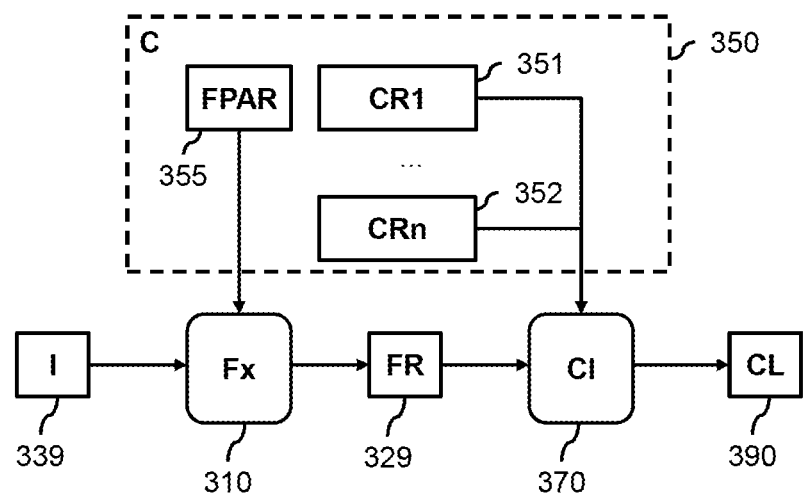
FIG. 3 shows a detailed example of how to use a classifier with class representations to classify an instance in accordance with the present invention.

FIG. 3 shows a detailed yet non-limiting example of how an instance may be classified by a classifier, e.g., a base classifier or a joint classifier obtained by adapting a base classifier to one or more novel classes. For example, a base classifier may be determined according to a method for learning a set of transformation parameters as described herein, e.g., as discussed with respect to FIGS. 5-6. A joint classifier may be determined according to a method for adapting a base classifier, e.g., as discussed with respect to FIG. 4.

Shown in the figure is a classifier C, 350. Classifier C may comprise class representations CR1, 351, up to CRn, 352 of one or more classes into which instances can be classified. For example, if classifier C is a base classifier, then the class representations may be of base classes, whereas if classifier C is a joint classifier, then the class representations may be of base classes and novel classes. Class representations CRi are typically vectors. For example, a class representation may comprise at most or at least 64, at most or at least 128, or at most or at least 256 features. Class representations CRi may themselves be based on instances, e.g., via feature extractor Fx; in the explanation below they are assumed to be given.

Classifier C may also comprise parameters FPAR of a feature extractor Fx, 310 for extracting feature representations from instances. Feature extractor Fx is typically a machine learning model with trainable parameters FPAR, e.g., feature extractor Fx may be a neural network with weights of the neural network being comprised in parameters FPAR, or any other type of model, e.g., a linear regression model, etc. As a concrete example, feature extractor Fx may comprise a neural network, e.g., a convolutional neural network. Feature extractors are described, e.g., in J. Snell, K. Swersky, and R. S. Zemel, "Prototypical networks for few-shot learning" (found at https://arxiv.org/abs/1703.05175 and incorporated herein by reference insofar as the feature extractors are concerned) and S. Gidaris and N. Komodakis, "Dynamic few-shot visual learning without forgetting" (found at https://arxiv.org/abs/1804.09458 and incorporated herein by reference insofar as the feature extractors are concerned).

Also shown is instance I, 339, to be classified. Instance I may be represented as a vector, a matrix, or any other data that can be input to feature extractor Fx. For example, an instance may represent an image or other type of sensor data. To classify instance I using classifier C, its feature representation FR, 329, may be extracted from the instance I by the feature extractor Fx. In classification Cl, 370, the feature representation FR may be matched to the class representations CR1, . . . , CRn. For example, instance I may be classified into a class whose class representation best matches the feature representation FR, e.g., a classification score of instance I may be determined with respect to each class and the classification C, 690, may be determined as a class with highest classification score.

As a concrete example, the classification score can be a conditional class probability of an instance x, I, belonging to a particular class i, computed according to a cosine similarity between feature representation $f_\psi(x)$ of the instance and class representations $c_i$, CRi, of the respective classes. Cosine similarity may be particularly effective, especially for joint classifiers. The cosine similarity can optionally also include a learnable temperature factor τ. For example, such a conditional class probability may be computed as:

$$p(y=i \mid x, c_1, \ldots, c_n) = \frac{\exp(\tau \cos(f_\psi(x), c_i))}{\sum_{m=1}^{n} \exp(\tau \cos(f_\psi(x), c_m))}.$$

As another example, class conditional probability of instance x may be computed based on the distance, e.g., L2 distance, of its feature representation to the class representations, e.g.:

$$p(y=i \mid x, c_1, \ldots, c_n) = \frac{\exp(-\|f_\psi(x) - c_i\|^2)}{\sum_{m=1}^{n} \exp(-\|f_\psi(x) - c_m\|^2)}.$$

Several variations of the above will be envisaged by the skilled person.

Figure 4:
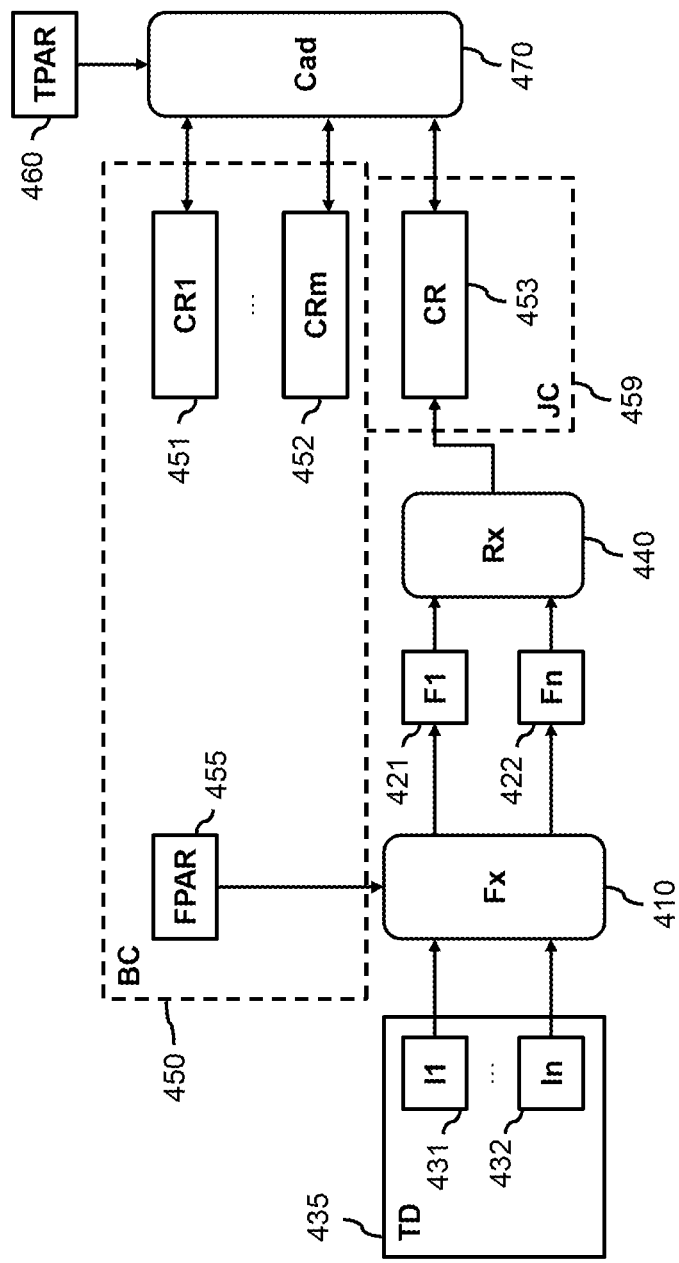
FIG. 4 shows a detailed example of how a base classifier may be adapted to one or more novel classes to obtain a joint classifier in accordance with the present invention.

FIG. 4 shows a detailed yet non-limiting example of how a base classifier may be adapted to one or more novel classes to obtain a joint classifier.

In more detail, shown in the figure is base classifier BC, 450. Base classifier BC may be configured to classify instances into one or more base classes. Base classifier BC may comprise class representations CR1, 451 up to CRm, 452 of the one or more base classes. Base classifier BC may also comprise parameters FPAR, 455, of feature extractor Fx, 410 for extracting feature representations from instances. For example, base classifier BC may be a classifier as discussed with respect to FIG. 3.

Also shown in the figure is training data TD, 435, for the one or more novel classes. In this example, training data TD is for a single novel class, but in general any number of novel classes can be used, e.g., at most or at least two, at most or at least ten, etc. The training data for a novel class may comprise one or more instances of the novel class, for example, instances I1, 431 up to In, 432, shown in the image. The number of training instances per novel class is typically small, e.g., one, two, at most five or ten, etc.

In order to adapt base classifier BC to the one or more novel classes, first, class representations of the one or more novel classes may be determined. In this example, a single class representation CR, 453 of the only novel class of training data TD is determined, but in general, a class representation may be similarly determined for each novel class. Class representation CR may be determined based on feature representations F1, 421, . . . , Fn, 422, extracted from respective training instances I1, . . . , In using feature extractor Fx. The class representation CR may be obtained, in representation extractor Rx, 440, by combining the feature representations, e.g., as an average $$c = \frac{1}{K} \sum_{i=1}^{K} \bar{z}_k,$$

where $z_k$ is the k-th instance of the class from training data TD and $\bar{x} := x/\mu x \mu$ denotes a normalized vector.

As shown in the figure, the class representations CR1, . . . , CRm of the base classes and the class representations CR of the novel classes may together form a matrix C of size $(N_{seen}+N) \times d$, where $N_{seen}$ is the number of base classes, N is the number of novel classes, and d is the dimension of the class representations.

Although the class representations of the novel classes CR obtained so far could be associated with the base classifier BC to obtain a joint classifier for the base and novel classes, interestingly, in this example the class representations of the base and novel classes are first adapted in an adaptation operation Cad, 470. As illustrated with the bidirectional arrows between the class representations CR, CRi and adaptation Cad, the adaptation may be bidirectional in the sense that at least one class representation CR of a novel class may be adapted based on a class representation CRi of a base class and at least one class representation CRj of a base class may be adapted based on a class representation of a (possibly different) novel class CR. As explained before, performing bidirectional updates may allow information to be propagated among the different classes so that a better joint classifier is obtained. In particular, the joint classifier JC may be obtained by associating the adapted class representations with the base classifier BC, e.g., joint classifier JC, 459, may comprise feature extractor parameters FPAR, updated base class representations CRi and updated novel class representations CR. This way, a classifier, e.g., as discussed with respect to FIG. 3, for the base classes and novel classes is obtained.

Interestingly, adapting the class representations may be performed based on a set of transformation parameters TPAR, 460. For example, the transformation parameters may be learned to optimize the way the class representations are adapted, hence leading to more high-quality class representations, e.g., as discussed with respect to FIGS. 5 and 6. Various examples of transformation parameters are discussed in more detail below.

Considering now in more detail how a class representation of a target class, e.g., a base class representation CRi or a novel class representation CR, may be adapted, at least two possibilities are available. Namely, class representations may be adapted based on other class representations and/or features of a class representation may be adapted based on other features (or side information, as discussed later), of the class representation itself. In both cases, it is a good design choice to use a linear transformation: to compute an adapted class representation, a weighted sum of class representations may be computed, and/or to compute an adapted feature, a weighted sum of features and/or side information may be computed.

Mathematically, in the case of linear transformations, the two types of updates may be captured by the expression $BC\Theta_B$, where C is a matrix in which the rows represent class representations; B is a convolution operator which transforms class representations based on other class representations; and $\Theta_B$ is a post-convolutional transform which transforms features based on other features. B may be a $(N_{seen}+N) \times (N_{seen}+N)$ operator containing relational information among classes, where $N_{seen}$ is the number of base classes and N is the number of novel classes. $\Theta_B$ can be seen as a post-convolutional transform, although since (BC) $\Theta_B = B(C\Theta_B)$, in this case it does not matter whether convolution operator B is first applied and post-convolutional transformation $\Theta_B$ later, or the other way round.

It is possible to determine multiple weighted sums, e.g., $\{BC\}_{B \in \mathcal{A}}$ for multiple operators B. As discussed later, there are several ways of determining the weights of matrix B, that each allow knowledge transfer between class transformations in a particular way. Accordingly, combining these multiple weighted sums allows to combine different ways of knowledge transfer. In other words, different sources of relational information can be combined. For each operator B, for example, the same or a separate post-convolutional transform $\Theta_B$ may be applied to obtain updated class representations $\{BC\Theta_B\}_{B \in \mathcal{A}}$ that can be combined into a single adapted class representation.

As a specific example, matrix C of updated class representations may be determined by class adjustment Cad using the formula:

$$C' = \rho\left(\sum_{B \in \mathcal{A}} s_B BC\Theta_B\right)$$

where $B \in \mathcal{A}$ are respective convolution operators containing relational information among classes, $\Theta_B$ is a post-convolutional transformation for B, $s_B$ are learnable scalars from transformation parameters TPAR to trade-off the influences from different operators, and $\rho$ is an optional non-linearity, e.g., a ReLU, leakyReLU, tan h, etc.

As another example, intermediate normalizations may be applied when computing matrix C of updated class representations, e.g., $$C' = \rho(\Sigma_{B \in \mathcal{A}} s_B \overline{BC\Theta_B})$$

where $\bar{x} := x/\mu x \mu$ denotes a normalized vector. For example, this allows to exploit the use of cosine distance between queries and prototypes in the classification by the joint classifier.

In various embodiments, to adjust the class representations, Cad applies an iterative process. That is to say, the class representations may be updated based on their initial values, updated again based on their updated values, etc., e.g., in two or more iterations. For example, the above formulas can be applied multiple times. Typically, non-linearity $\rho$ is applied in earlier iterations of the iterative process but not in the final layer, so as not to restrict the values of the updated class representations, e.g., to ensure that negative entries can occur in the updated class representations. Depending on the type of convolution operator, matrix B may be recomputed each iteration or kept constant.

Several possibilities to determine weights of class representations, e.g., entries of convolution operator B, are now discussed. Essentially, the weights encode relational information between classes and/or their representations. Weight $B_{i,j}$ may denote the relevance of the jth class representation for updating the ith class representation.

In various embodiments, a weight $B_{i,j}$ indicates a similarity between the jth class representation and the ith class representation of the target class. In other words, the similarity may be computed based on the class representations themselves, e.g., $B_{i,j} = \text{sim}(c_n, c_m)$ where sim can be any standard similarity or distance measure, e.g., cosine distance, dot product, L2 distance, Mahalanobis distance, etc. In various embodiments, the similarity measure is a parametrized similarity measure whose parameters are comprised in the set of transformation parameters TPAR. For example, the similarity may be computed by first transforming the class representations into a transformed space and then computing a similarity in the transformed space, e.g., $B_{i,j} = \text{sim}(\psi c_n, \psi c_m)$, wherein transformation $\psi$ is given in transformation parameters TPAR, e.g., as a linear transformation, a multi-layer perceptron, etc. As another example, similarity may be determined by applying a neural network, e.g., a CNN or multilayer perceptron, to element-wise absolute differences, e.g., $B_{i,j} = \text{CNN}(\text{abs}(c_n - c_m))$, with the neural network being given by transformation parameters TPAR. Having computes similarities, they can optionally be post-processed, e.g., by thresholding, selecting the top-k most similar entries, row-wise L2/softmax normalization, etc. In various cases, the use of learned transformation parameters may allow to determine the similarity in the most effective way for the problem at hand.

Instead of or in addition to using the class representations, the weights may also be based at least in part on one or more side information values associated to the class representations CRi (not shown). For example, the side information values may be included in the vectors whose similarity are computed as discussed above. Side information values are typically independent from the instances of the class, e.g., they represent information about the class that is obtained separately from the class instances. Relevant side information values depend from application to application, but can be obtained, e.g., from ontologies such as WordNet, knowledge graphs, annotated attributes, semantic embeddings of class labels, e.g., using word2vec, or other semantic embeddings, e.g., an embedding of a Wikipedia page or other text about the class, or any other class-specific attributes, e.g., typical dimensions of an object, etc. For example, a weight may be indicative of a number of hops between two classes in an ontology. Weights may also be provided by expert annotations, for example.

Since the side information values do not relate to any instance in particular, they are typically also not comprised in the base classifier and/or joint classifier, e.g., they are not used for the classification of instances. However, their availability when adapting the base classifier can help to select which class representations are relevant to update a target class representation. It is possible that side information values are available only for a subset of the classes; in this case, the side information value for classes where it is not available can be left empty, e.g., zero, so as to ignore such classes for a particular convolutional operator.

As another example of side information, also relational side-information may be used, indicating a similarity between the target class j and class i that is independent from the class representations themselves. Such relational side-information can be used directly, or possibly after normalization, as a weight of a convolutional operator. Relational side-information may directly indicate the relevance of class j for updating the representation of class i, e.g., the relational side-information may be obtained directly without the need to determine it by computing a similarity. As an example, relational side-information comprise a shortest-path distance between two classes in WordNet, or any other side-information that expresses pairwise similarity. Relational side-information may also be converted into class-wise side information, e.g., by using a normalized distance to other classes as values. Also relational side information can be left empty if not available for a particular pair of classes.

Also the weights for adapting features of a class representation based on other features, e.g., in post-convolutional transform $\Theta_B$, can be selected in various ways. In an embodiment, $\Theta_B$ is a learnable quadratic weight matrix, e.g., parametrized by transformation parameters TPAR. In an embodiment, $\Theta_B$ is constrained to be diagonal, thus reducing the number of transformation parameters TPAR to reduce the risk of over-fitting.

Figures 5, 6:
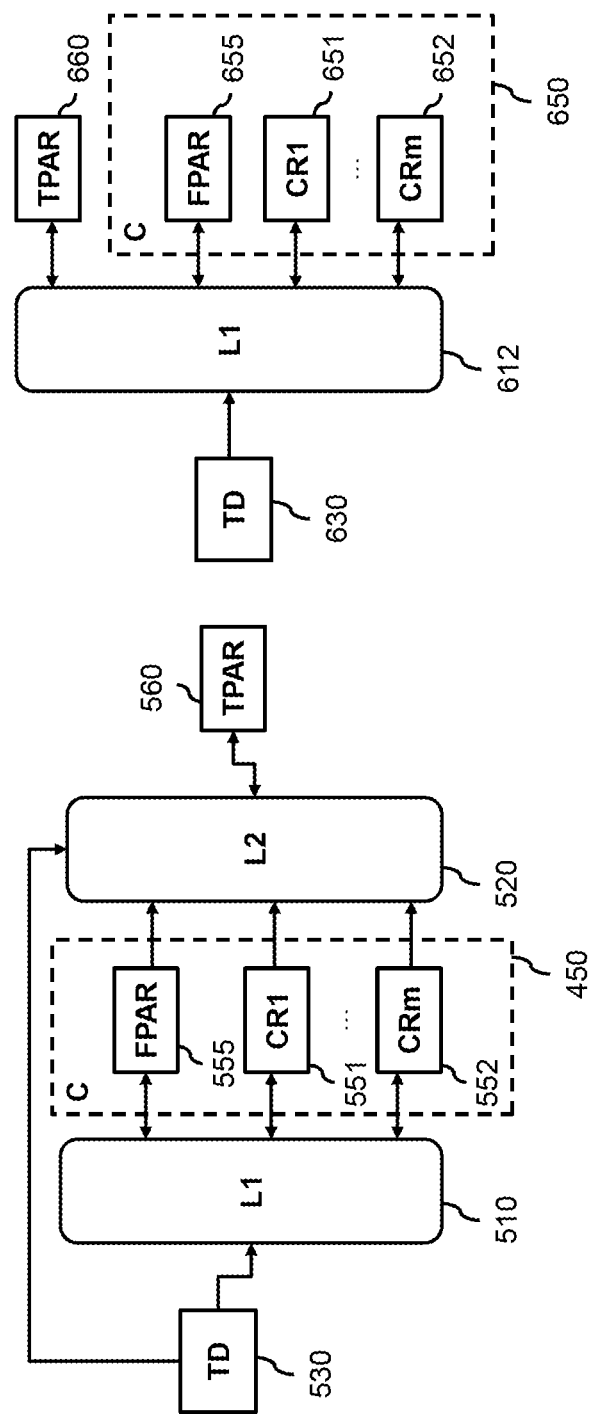
FIG. 5 shows a detailed example of how a set of transformation parameters for adapting a base classifier to one or more novel classes may be learned in accordance with the present invention.
FIG. 6 shows a detailed example of how a set of transformation parameters for adapting a base classifier to one or more novel classes may be learned in accordance with the present invention.

Two detailed examples of how to learn a set of transformation parameters for adapting a base classifier to one or more novel classes are now discussed with respect to FIGS. 5 and 6. Generally, the procedures of FIG. 5 and FIG. 6 to learn a set of transformation parameters may be regarded as meta-learning approaches to the GFSL problem. Whereas GFSL may aim to generalize the base classifier to a specific set of unseen classes, the set of transformation parameters may be determined with an aim of adapting fast and well across varying tasks involving previously unseen classes. In FIGS. 5 and 6, this meta-learning problem is approached by means of episodic sampling, e.g., in each so-called episode, a specific task, e.g., a N-way K-shot instance, may be sampled from training data, which may then be executed using a current set of transformation parameters to measure its quality, e.g., in the form of a classification loss.

In both cases, the set of transformation parameters may be learned based on training data for multiple classes. Such training data may comprise one or more instances of each of the classes. For instance, the instances may represent images or other types of sensor data, as also discussed above. A relatively large number of classes may be available, e.g., at least 10, at least 50, at least 100, etc. At least the number of classes is typically much larger than the number of novel classes used when adapting a base classifier using the set of transformation parameters, e.g., at least 10 times as large, at least 100 times as large, etc. Also the number of training instances per class can be relatively large, e.g., at least 10 instances may be available for each class or at least for most of the classes, and is typically at least twice of five times as large as the number of instances of novel classes available when adapting a base classifier using the transformation parameters.

FIG. 5 shows a first detailed example of how to learn a set of transformation parameters for adapting a base classifier to one or more novel classes.

Shown in the figure is training data TD, 530 for multiple classes, as discussed above. Also shown in the figure are class representations CR1, 551, up to CRm, 552, of the multiple classes of training data TD, and parameters FPAR, 555, of a feature extractor for extracting feature representations from instances. The class representations CRi and feature extractor parameters FPAR may together form a classifier C, 450 that can be used to classify instances into the multiple classes, e.g., as discussed with respect to FIG. 3. Classifier C may be used as a base classifier to be adapted to novel classes, e.g., as discussed with respect to FIG. 4.

As shown in FIG. 5, in this example, class representations CRi and parameters FPAR are determined by learning the class representations CRi and parameters FPAR in a learning operation L1, 510, prior to learning the set of transformation parameters. In other words, starting from training data TD, training proceeds in two phases: a first phase in which the base classifier is learned and a second phase in which the transformation parameters are learned. For example, the first phase of training may be performed as disclosed in "Dynamic Few-Shot Visual Learning without Forgetting" by S. Gidaris and N. Komodakis (found at https://arxiv.org/abs/1804.09458 and incorporated herein by reference insofar as the first-phase training is concerned).

In second learning operation L2, 520, set of transformation parameters TPAR, 460, is learned. The transformation parameters are learned by episodic training, in other words, by repeatedly constructing a base classifier and adapting it using respective values for the set of transformation parameters. Hence, transformation parameters TPAR that are best suited to adapting a base classifier may be found. For example, the transformation parameters TPAR may be updated in an iterative process based on a classification loss, e.g., using stochastic gradient descent or other optimization methods. As is conventional, such optimization methods may be heuristic and/or may arrive at a local optimum.

In more detail, a base classifier may be constructed by selecting one or more base classes and one or more novel classes from the multiple classes of training data TD. For example, for N-way, K-shot classification, a fixed number of N novel classes may be selected from the multiple classes, e.g., randomly. The remaining classes, or a subset of them, may be selected as base classes. A base classifier may be constructed that is configured to classify instances into the one or more base classes based on the class representations of the one or more base classes and the parameters of the feature extractor. For example, the base classifier may comprise the class representations CRi of the base classes and the transformation parameters TPAR.

The base classifier may then be adapted to the novel classes. To this end, training data for the one or more novel classes may be selected from the training data TD. For example, for N-way, K-shot classification, a fixed number of K instances of each novel class may be selected, e.g., randomly, from training data TD. The constructed base classifier may then be adapted to the one or more selected novel classes, for example, as discussed with respect to FIG. 4, wherein the base classifier BC, 450; the training data TD, 435, and the transformation parameters TPAR, 460 are as described here.

A classification loss of the adapted base classifier may then be determined for instances of the one or more base classes and the one or more novel classes. For example, a fixed number of query instances may be sampled for each class, e.g., randomly, from the training data TD. Various numbers of query instances may be used, e.g., at most or at least 5, at most or at least 10, at most or at least 50, etc. Interestingly, both base class instances and novel class instances may be used as query instances, so that the model is rewarded for global discrimination and not only for its performance on the novel classes. The classification loss can be standard cross-entropy. The loss can also be computed for novel class queries and base class queries separately and then combined by a weighted mean, for example. The classification loss can be used at least to measure the quality of the transformation parameters TPAR; when using optimization methods such as stochastic gradient descent, the transformation parameters TPAR can also be updated to decrease the loss function, thus iteratively improving the set of transformation parameters.

FIG. 6 shows a second detailed example of how to learn a set of transformation parameters for adapting a base classifier to one or more novel classes. Interestingly, in this second example, instead of using a 2-phase strategy as in FIG. 5, the class representations of the multiple classes and/or the parameters of the feature extractor are learned in the same learning procedure as the set of transformation parameters. For example, as shown in this figure, the transformation parameters TPAR, 660, feature extractor parameters FPAR, 655, and class representations CRi, 651, 652, may all be learned from training data TD, 630, in a single learning procedure L1, 612. Especially when using side information, combining the training of the feature extractor parameters FPAR, class representations CRi, and transformation parameters TPAR in a single phase may be beneficial since it avoids getting stuck, before learning the transformation parameters TPAR, with feature extractor parameters and class representations that are inconsistent with the side information that can be used by the transformation parameters.

In more detail, shown is training data TD training data for multiple classes. As discussed above, a relatively large number of classes/instances may be available.

Also shown in the figure are class representations CR1, 651, up to CRm, 652 of the multiple classes of training data TD; parameters FPAR, 655, of a feature extractor for extracting feature representations from instances; and a set of transformation parameters TPAR, 560. These class representations and parameters correspond to those shown in FIG. 5, except that in this case, the class representations and feature extractor parameters are learned along with the set of transformation parameters by repeatedly constructing a base classifier and adapting it to novel classes by episodic training.

Similarly to FIG. 5, in a so-called episode, one or more base classes and one or more novel classes may be selected from the multiple classes of training data TD, e.g., a fixed number N of novel classes are selected, e.g., randomly, and the remaining classes or a subset of them are selected as base classes. A base classifier may then be constructed which is configured to classify instances into the one or more base classes, based on the current class representations CRi of the one or more base classes and the current parameters FPAR of the feature extractor. Training data for the one or more novel classes may selected from the training data, e.g., K instances per class for N-way K-shot classification, and the base classifier may be adapted to the one or more novel classes, e.g., as discussed with respect to FIG. 4, using the current transformation parameters TPAR.

In FIG. 6, however, not just the transformation parameters are learned based on a classification loss of the adapted base classifier for query instances: interestingly, also the class representations CRi and/or the feature extractor parameters FPAR may be learned based on the classification loss, e.g., the class representations and/or feature extractor parameters may be updated to decrease the loss function using optimization methods such as stochastic gradient descent. Accordingly, the loss function, e.g., cross-entropy, may be back-propagated to update various learnable parts of the model including the feature extractor parameters FPAR, the initial seen class prototypes CRi, and various transformation parameters TPAR such as trainable components of the operators, the post-convolutional transforms, and classifier temperature. Interestingly, no multi-stage training or other pre-training, such as for image features, may be needed. Still, a classifier C, 650 comprising the feature extractor parameters FPAR and class representations CRi may be obtained, e.g. for use as a classifier according to FIG. 3 or as a base classifier according to FIG. 4; as well as transformation parameters TPAR for adapting classifier C to novel classes that are not in training data TD.

At this point, an interesting difference may be observed between base class representations CRi 651, 652 as trained in this example and novel class representations CR, 453 as trained when adapting the base classifier. Here, the base class representations may be learnable model parameters, e.g., learned through stochastic gradient descent or similar. In particular, they are not directly computed from training instances of that class. On the other hand, the novel class representations CR of FIG. 4 may be determined, at least initially, from few-shot learning instances, in other words, they are determined on-the-fly for each new task. Thereby, fast learning for novel few-shot classes may be combined with slow learning for the classes of training dataset TD, e.g., the information from training dataset TD may be incorporated in the classifier instead of being forgotten.

FIG. 7 shows a block-diagram of computer-implemented method 700 of adapting a base classifier to one or more novel classes. The method 700 may correspond to an operation of the system 100 of FIG. 1. However, this is not a limitation, in that the method 700 may also be performed using another system, apparatus or device.

The method 700 may comprise, in an operation titled "ACCESSING BASE CLASSIFIER", accessing 710 data representing the base classifier, the data comprising class representations of one or more base classes of the base classifier and parameters of a feature extractor for extracting feature representations from instances. The base classifier may be configured to classify an instance into the one or more base classes by matching a feature representation extracted from the instance by the feature extractor to the class representations of the one or more base classes. Method 700 may also comprise adapting the base classifier by carrying out one or more of operations 720-750 discussed below.

The method 700 may comprise, in an operation titled "OBTAINING TRAINING DATA", obtaining 720 training data for one or more novel classes. The training data for a novel class may comprise one or more instances of the novel class. The method 700 may also comprise, in an operation titled "DETERMINING CLASS REPRESENTATIONS", determining 730 class representations of the one or more novel classes. The method 700 may comprise, in an operation titled "EXTRACTING FEATURE REPRESENTATIONS" performed as part of the determining 730, extracting 735 feature representations of the one or more instances of the novel class using the feature extractor.

The method 700 may further comprise, in an operation titled "DETERMINING ADAPTED CLASS REPRESENTATIONS", determining 740 adapted class representations of the base classes and of the novel classes. The method 700 may comprise, in an operation titled "ADAPTING NOVEL FROM BASE" performed as part of the determining 740, adapting 745 at least one class representation of a novel class based on a class representation of a base class. Method 700 may comprise, in an operation titled "ADAPTING BASE FROM NOVEL" performed as part of the determining 740, adapting 746 at least one class representation of a base class based on a class representation of a novel class.

The method 700 may moreover comprise, in an operation titled "OBTAINING JOINT CLASSIFIER", associating 750 the adapted class representations with the base classifier to obtain a joint classifier for classifying instances into the one or more base classes and the one or more novel classes.

FIG. 8 shows a block-diagram of computer-implemented method 800 of learning a set of transformation parameters. The set of transformation parameters may be for adapting a base classifier to one or more novel classes. The method 800 may correspond to an operation of the system 200 of FIG. 2. However, this is not a limitation, in that the method 800 may also be performed using another system, apparatus or device.

The method 800 may comprise, in an operation titled "ACCESSING DATA", accessing 810 training data for multiple classes, the training data for a class comprising one or more instances of the class; and data representing class representations of the multiple classes and parameters of a feature extractor for extracting feature representations from instances. The method 800 may further comprise learning the set of transformation parameters by repeatedly performing one or more of operations 820-860 discussed below.

The method 800 may comprise, in an operation titled "SELECTING BASE, NOVEL CLASSES", selecting 820 one or more base classes and one or more novel classes from the multiple classes. The method 800 may comprise, in an operation titled "CONSTRUCTING BASE CLASSIFIER", constructing 830 a base classifier configured to classify instances into the one or more base classes based on the class representations of the one or more base classes and the parameters of the feature extractor. The method 800 may also comprise, in an operation titled "SELECTING NOVEL CLASS TRAINING DATA", selecting 840 training data for the one or more novel classes from the training data. The method 800 may further comprise, in an operation titled "ADAPTING BASE CLASSIFIER", adapting 850 the base classifier to the one or more novel classes by a method as described herein. The adapted class representations of the one or more base classes and of the one or more novel classes may be determined using the set of classification parameters. The method 800 may also comprise, in an operation titled "DETERMINING CLASSIFICATION LOSS", determining 860 a classification loss of the adapted base classifier for instances of the one or more base classes and the one or more novel classes.

It will be appreciated that, in general, the operations of method 700 of FIG. 7 and method 800 of FIG. 8 may be performed in any suitable order, e.g., consecutively, simultaneously, or a combination thereof, subject to, where applicable, a particular order being necessitated, e.g., by input/output relations.

The method(s) may be implemented on a computer as a computer implemented method, as dedicated hardware, or as a combination of both. As also illustrated in FIG. 9, instructions for the computer, e.g., executable code, may be stored on a computer readable medium 900, e.g., in the form of a series 910 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 9 shows an optical disc 500. Alternatively, the computer readable medium 900 may comprise transitory or non-transitory data 910 representing a set of transformation parameters for adapting a base classifier to one or more novel classes as described elsewhere in this specification.

Examples, embodiments or optional features, whether indicated as non-limiting or not, are not to be understood as limiting the present invention.

It should be noted that the above-mentioned embodiments illustrate rather than limit the present invention, and that those skilled in the art will be able to design many alternative embodiments without departing from the scope of the present invention. Use of the verb "comprise" and its conjugations does not exclude the presence of elements or stages other than those. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The present invention may be implemented by means of hardware comprising several distinct elements, and by means of a suitably programmed computer. In the device include several elements, several of these means may be embodied by one and the same item of hardware. The mere fact that certain measures are described mutually separately does not indicate that a combination of these measures cannot be used to advantage.

What is claimed is:

1. A system for adapting a base classifier to one or more novel classes, the system comprising:
   a data interface for accessing data representing the base classifier, the data including:
   class representations of one or more base classes of the base classifier; and
   parameters of a feature extractor for extracting feature representations from instances, wherein the base classifier is configured to classify each of instances into the one or more base classes by matching a feature representation extracted from the instance by the feature extractor to the class representations of the one or more base classes; and a processor subsystem configured to adapt the base classifier by:

obtaining training data for one or more novel classes;

for respective ones of the one or more novel classes, determining a respective class representation of the respective novel class, wherein, for each respective one of the one or more novel classes:

the training data for the respective novel class includes one or more instances of the novel class; and the determining of the respective class representation of the respective one novel class includes extracting feature representations of the one or more instances of the respective novel class using the feature extractor;

determining adapted class representations of the one or more base classes and of the one or more novel classes, including adapting at least one of the class representations of the one or more novel classes based on one of the class representations of the one or more base classes and adapting at least one of the class representations of the one or more base classes based on one of the class representations of the one or more novel classes; and associating the adapted class representations with the base classifier to obtain a joint classifier for classifying instances into the one or more base classes and the one or more novel classes.

2. The system according to claim 1, wherein the processor subsystem is configured to determine an adapted class representation of a target class by computing a weighted sum of class representations of the one or more base classes and of the one or more novel classes.

3. The system according to claim 2, wherein a weight of a respective class representation in the weighted sum indicates a similarity between the respective class representation and the class representation of the target class, the processor subsystem being configured to determine the weight from the respective class representation and the class representation of the target class.

4. The system according to claim 2, wherein the processor subsystem is configured to determine the weight based at least in part on one of more side information values associated to the class representations, the one or more side information values for one of the one or more novel classes being independent from the one or more instances of the one of the one or more novel classes.

5. The system according to claim 2, wherein a weight of a respective class representation in the weighted sum indicates a similarity between the class of the respective class representation and the target class independent from their class representations, the data interface being for further accessing the weight.

6. The system according to claim 2, wherein the processor subsystem is configured to determine the adapted class representation of the target class by computing multiple weighted sums using respective weights, and combining the multiple weighted sums into a single adapted class representation.

7. The system according to claim 1, wherein the processor subsystem is configured to determine the adapted class representations by further adapting a feature of a class representation by computing a weighted sum of features and/or side information values of the class representation.

8. The system according to claim 1, wherein the processor subsystem is configured to determine the adapted class representations in an iteration of an iterative process, and to further adapt the adapted class representations in one or more further iterations of the iterative process.

9. The system according to claim 1, wherein the processor subsystem is further configured to:

obtain a query instance; and determine a classification score of the query instance with respect to each base class and each novel class using the joint classifier, and determine a classification of the query instance into a base class or a novel class therefrom.

10. The system according to claim 1, wherein the determining of the adapted class representations of the base classes and of the novel classes is performed based on a set of transformation parameters.

11. The system according to claim 10, wherein:

the processor subsystem is configured to determine an adapted class representation of a target class by computing a weighted sum of class representations of the one or more base classes and of the one or more novel classes;

a weight of a respective one of the class representations in the weighted sum indicates a similarity between the respective class representation and the class representation of the target class;

the processor subsystem is configured to determine the weight based at least in part on one of more relational side information values associated to the class representations; and the one or more relational side information values for a novel class is independent from the one or more instances of the novel class.

12. The system according to claim 10, wherein:

the system is configured to access, via the data interface:

for each respective class of a plurality of classes, respective training data that includes one or more instances of the respective class; and data representing class representations of the plurality of classes and parameters of a feature extractor for extracting feature representations from instances; and the processor subsystem is configured to learn the set of transformation parameters by repeatedly:

selecting one or more of the base classes and one or more of the novel classes from the plurality of classes;

constructing a base classifier configured to classify instances into the selected one or more base classes based on the class representations of the selected one or more base classes and the parameters of the feature extractor;

selecting from the training data for the one or more novel classes;

adapting the constructed base classifier to the selected one or more novel classes, the adapted class representations of the one or more base classes and of the one or more novel classes being determined using the set of transformation parameters; and determining a classification loss of the adapted base classifier for instances of the one or more base classes and the one or more novel classes.

13. The system according to claim 12, wherein the processor subsystem is configured to determine the class representations of the plurality of classes and the parameters of the feature extractor by learning the class representations and the parameters in a learning operation prior to learning the set of transformation parameters.

14. The system according to claim 12, wherein the processor subsystem is configured to additionally learn the class representations of the plurality of classes and/or the parameters of the feature extractor based on the classification loss of the adapted base classifier.

15. A computer-implemented method of adapting a base classifier to one or more novel classes, the method comprising the following steps:
   accessing data representing the base classifier, the data including:
      class representations of one or more base classes of the base classifier; and
      parameters of a feature extractor for extracting feature representations from instances, wherein the base classifier is configured to classify each of the instances into the one or more base classes by matching a feature representation extracted from the instance by the feature extractor to the class representations of the one or more base classes; and
   adapting the base classifier by:
      obtaining training data for one or more novel classes;
      for respective ones of the one or more novel classes, determining a respective class representation of the respective novel classes, wherein, for each respective one of the one or more novel classes:
         the training data for the respective novel class includes one or more instances of the novel class; and
         the determining of the respective class representation of the respective one novel class includes extracting feature representations of the one or more instances of the respective novel class using the feature extractor;
      determining adapted class representations of the one or more base classes and of the one or more novel classes, including adapting at least one of the class representations of the one or more novel classes based on one of the class representations of the one or more base classes and adapting at least one of the class representations of the one or more base classes based on one of the class representations of the one or more novel classes; and
   associating the adapted class representations with the base classifier to obtain a joint classifier for classifying instances into the one or more base classes and the one or more novel classes.

16. The computer-implemented method according to claim 15, wherein the determining of the adapted class representations of the base classes and of the novel classes is performed based on a set of transformation parameters.

17. The computer-implemented method according to claim 16, further comprising:
   accessing:
      for each respective class of a plurality of classes, respective training data that includes one or more instances of the respective class; and
      data representing class representations of the plurality of classes and parameters of a feature extractor for extracting feature representations from instances; and
   learning the set of transformation parameters by repeatedly:
      selecting one or more of the base classes and one or more of the novel classes from the plurality of classes;
      constructing a base classifier configured to classify instances into the one or more base classes based on the class representations of the one or more base classes and the parameters of the feature extractor;
      selecting from the training data for the one or more novel classes;
      adapting the base classifier to the one or more novel classes, the adapted class representations of the one or more base classes and of the one or more novel classes being determined using the set of transformation parameters; and
      determining a classification loss of the adapted base classifier for instances of the one or more base classes and the one or more novel classes.

18. A non-transitory computer-readable medium on which is stored data representing instructions for adapting a base classifier to one or more novel classes, the instructions, when executed by a computer, causing the computer to perform the following steps:
   accessing data representing the base classifier, the data including:
      class representations of one or more base classes of the base classifier; and
      parameters of a feature extractor for extracting feature representations from instances, wherein the base classifier is configured to classify each of the instances into the one or more base classes by matching a feature representation extracted from the instance by the feature extractor to the class representations of the one or more base classes; and
   adapting the base classifier by:
      obtaining training data for one or more novel classes;
      for respective ones of the one or more novel classes, determining a respective class representation of the respective novel classes, wherein, for each respective one of the one or more novel classes:
         the training data for the respective novel class includes one or more instances of the novel class; and
         the determining of the respective class representation of the respective one novel class includes extracting feature representations of the one or more instances of the respective novel class using the feature extractor;
      determining adapted class representations of the one or more base classes and of the one or more novel classes, including adapting at least one of the class representations of the one or more novel classes based on one of the class representations of the one or more base classes and adapting at least one of the class representations of the one or more base classes based on one of the class representations of the one or more novel classes; and
   associating the adapted class representations with the base classifier to obtain a joint classifier for classifying instances into the one or more base classes and the one or more novel classes.

* * * * *